United States Patent [19]
Marrone

[11] 3,922,063
[45] Nov. 25, 1975

[54] WINCH MOUNTED OPTICAL DATA TRANSMISSION CABLE WITH FLUID COUPLING

[75] Inventor: Frederick A. Marrone, San Diego, Calif.

[73] Assignee: The United States of America as represented by the Secretary of the Navy, Washington, D.C.

[22] Filed: Aug. 29, 1974

[21] Appl. No.: 501,532

[52] U.S. Cl. ............ 350/96 C; 350/96 R; 350/96 B
[51] Int. Cl.² .......................................... G02B 5/14
[58] Field of Search .............. 350/96 C, 96 B, 96 R; 354/64; 191/12.2 R, 12.2 A; 250/227

[56] References Cited
UNITED STATES PATENTS

| | | | |
|---|---|---|---|
| 3,360,640 | 12/1967 | Seitz et al. | 350/96 B X |
| 3,389,950 | 6/1968 | Harper | 350/96 BC |
| 3,480,786 | 11/1969 | Kottman | 250/227 X |
| 3,510,667 | 5/1970 | Cleveland et al. | 250/227 |
| 3,733,981 | 5/1973 | Buchanan | 354/64 |
| 3,740,116 | 6/1973 | Andrews | 350/96 B |
| 3,743,796 | 7/1973 | Rosencrantz | 191/12.2 A |
| 3,780,220 | 12/1973 | Fugitt et al. | 354/64 X |
| 3,788,730 | 1/1974 | Greenleaf | 354/64 X |
| 3,825,320 | 7/1974 | Redfern | 350/96 C X |

*Primary Examiner*—David H. Rubin
*Attorney, Agent, or Firm*—Richard S. Sciascia; Ervin F. Johnston; William T. Skeer

[57] ABSTRACT

An oceanographic winch is specially designed to store, pay out, and recover an optical data transmission cable between two points, which may vary in separation distance. The ends of the optical data transmission cable are held in aligned proximity while immersed in a fluid having the index of refraction as the optical elements. This fluid is contained in a fluid-tight, pressure-compensated reservoir constructed in the hub of the oceanographic winch.

5 Claims, 2 Drawing Figures

WINCH MOUNTED OPTICAL DATA TRANSMISSION CABLE WITH FLUID COUPLING

STATEMENT OF GOVERNMENT INTEREST

The invention described herein may be manufactured and used by or for the Government of the United States of America for governmental purposes without the payment of any royalties thereon or therefor.

FIELD OF THE INVENTION

This invention pertains to the field of optics. More particularly, this invention pertains to the transfer of intelligence along an optical communications path. In still greater particularity, this invention pertains to the optical transmission of oceanographic data. By way of further characterization, but without limitation thereto, the invention shall be described as it pertains to an oceanographic winch for utilizing fiber optic data transmission links.

DESCRIPTION OF THE PRIOR ART

The transmission of optical pulses along fiber optic transmission media is well understood in the optics arts. However, for the most part, such data transmission is between two points having relatively fixed physical separation. In recent times, the use of optical data transmission linkages has proven a valuable communication technique in deep ocean environments. See, particularly, U.S. Pat. No. 3,825,320, issued on July 23, 1974 to John T. Redfern for "High-Pressure Optical Bulkhead Penetrator." In finding these new applications in the oceanographic environment, great dependence is made of conventional marine hardware which is designed primarily for other purposes. Thus, attempts have been made to utilize the brushless commutator-type oceanographic winches disclosed in U.S. Pat. No. 3,743,796, issued on July 3, 1973 to Donald M. Rosencrantz for "Deep Sea Brushless Commutator." Although such systems offer limited degrees of success, a need has been felt for oceanographic equipment designed especially for this new data transmission medium.

SUMMARY OF THE INVENTION

This invention provides an oceanographic winch which is designed especially for handling optical data transmission cable such as the fiber optic type and includes an integral coupling system to couple the fiber optic cable spooled thereon to utilization devices on board one of the oceanographic vehicles. This fluid reservoir is filled with a material having the same optical index of refraction as the fiber optic transmission path such as to effect an optical coupling between the spooled length of cable and the stationary utilization equipment. Further, a pressure compensation for the fluid chamber permits the winch to be used in submersibles as well as surface applications.

STATEMENT OF THE OBJECTS OF THE INVENTION

It is, accordingly, an object of this invention to provide an improved oceanographic winch.

Another object of this invention is the provision of a coupling between fiber optic transmission media.

A further object of this invention is the provision of an oceanographic winch for use with fiber optic oceanographic cable.

Another object of this invention is the provisions of a rotary-to-fixed optical transmission cable.

Still another object of this invention is to provide an oceanographic winch for optical cable having a fluid coupling therein.

These and other objects of the invention will become more readily apparent from the ensuing specification when taken with the drawings.

DESCRIPTION OF THE PREFERRED EMBODIMENT

Figure 1:
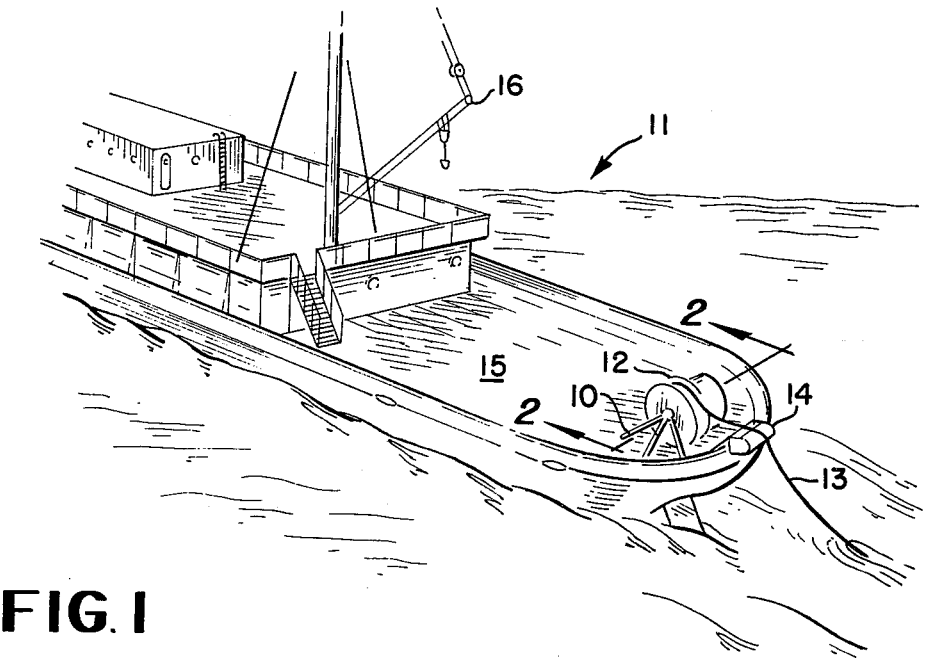
FIG. 1 is a perspective view of an oceanographic vessel using the invention.

Referring to FIG. 1, an oceanographic vessel, indicated generally at 11, tows an optical data transmission cable 13, which is payed out from its storage position on an improved oceanographic winch 12. Conventional cable handling gear, such as shown at 14, carries cable 13 safely from winch 12 and over the side of vessel 11.

Of course, vessel 11 may be other than the surface vessel shown. For example, the oceanographic vessel may be a submarine vessel in which case winch 12 may be remotely controlled so as to permit paying out and reeling in oceanographic cable 13 while submerged. At the distal end of cable 13 a conventional, battery-operated submersible vehicle (not shown) is located. Of course, other types of oceanographic submersibles may be employed, if desired, such as, for example, that shown in U.S. Pat. No. 3,780,220 issued on Dec. 18, 1973 to Ronald B. Fugitt et al for "Remote Control Underwater Observation Vehicle."

As is conventional in the oceanographic arts, oceanographic vessel 11 may have other support facilities for the submersible vehicle, including a weather deck space indicated at 15 to which winch 12 is affixed by a conventional base member 10; and conventional handling gear, such as hoist apparatus 16, to facilitate successful deployment of the submersible vehicle.

Figure 2:
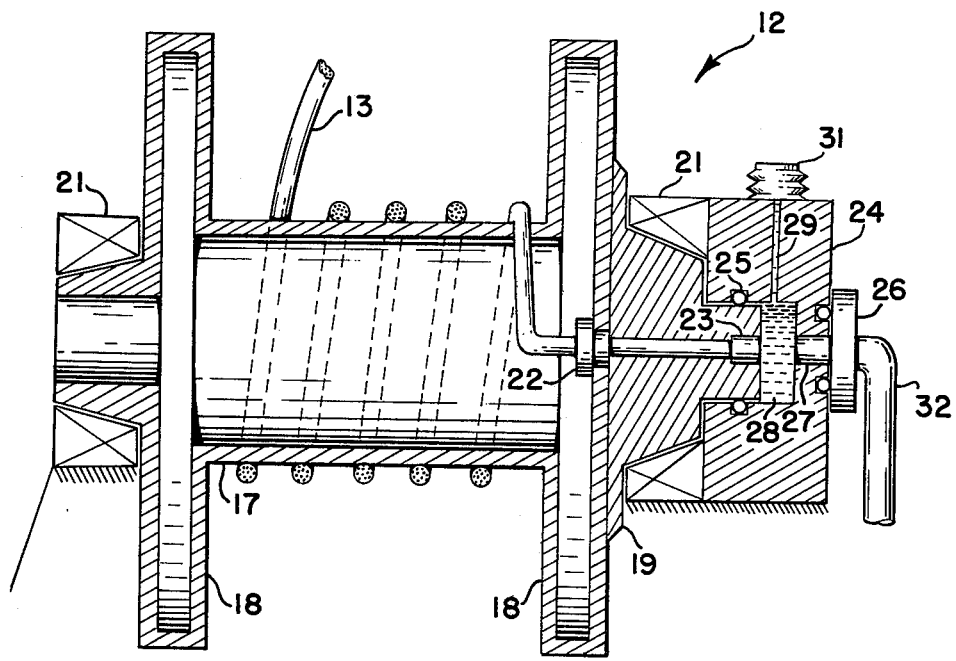
FIG. 2 is a sectional view of the oceanographic winch according to the invention taken along line 2—2 of FIG. 1.

Referring to FIG. 2, the salient operational features of the invention are illustrated. As shown, winch 12 includes a cylindrical drum 17 which is spaced between flanges 18 to spoolably receive and pay out optical data transmission cable 13. Optical data transmission cable 13 may be of any conventional state-of-the-art cable. For a more complete description of the optical properties and possible utilization devices, attention is invited to standard text and descriptive material. For example, the article entitled "Wires of Glass" appearing in Industrial Research magazine, the August 1974 issue at pages 50 through 54, written by Mauro DiDomenico, Jr., is fairly representative of the state-of-the-art concerning such cables and their construction and is incorporated herein.

Cylinder 17, together with flanges 18, is rotatably supported by outstanding hub members, indicated at 19, which, in turn, are held in suitable bearings 21. In the illustrated arrangement, bearings 21 are conical bearings in order to take any axial thrust caused by winding of cable 13 on cylinder 17. Of course, cylindrical bearings may be used in the support of hubs 19 if other provision is provided for absorbing the axial thrust. However, bearings 21 are conventional, mechanical bearings and serve as a base member which is ultimately attached to the oceanographic vehicle 11 for rotatable support of cylinder 17.

As shown, optical cable 13 is terminated by a bushing 22, which supports a length thereof extending through hub 19 and terminates in a conventional optical window 23. Optical window 23 is attached to cable 13 by conventional, optical bonding techniques which may include, for example, an epoxy, cementious bond. A portion of the base means 24, which is attached to bearing 21, is fashioned to accomodate the end of hub 19 in a fluid-tight fashion, as by means of a O-ring seal 25.

Body member 24 is further fashioned to provide an enclosed space 28. A second optical window 27 is carried in body member 24 in a spaced-apart relationship from window 23 and is connected to a similar optical cable 32 which is secured by a flange 26. Of course, the utilization device 32 may be other than a fiber optic cable, if desired. For example, various photo cells and optical light sources may be mounted directly on body member 24, so as to cooperate with cable 13. However, the illustrated arrangement in which the utilization devices are mounted below decks of vessel 11 in a more sheltered location is the more conventional arrangement.

Enclosed space 28 has a narrow passage 29 which communicates to the exterior of base member 24 for purposes of filling and draining fluid carried therein. Also, a pressure regulator means such as bellows 31, may be conveniently mounted on the exterior of base member 24 and cooperate with enclosed space 28 such as to maintain the fluid pressure therein at a predetermined equilibrium with the ambient pressure surrounding oceanographic winch 12. Sucn an arrangement is particularly desirable when oceanographic winch 12 is mounted on the submersible vehicle. In the illustrated arrangement, where oceanographic winch 12 is mounted on a surface vessel, pressure regulating means 31 may simply comprise a fluid reservoir which will ensure that optical windows 23 and 27 are bathed in a suitable fluid.

The fluid used to fill enclosed space 28 may be a light oil, kerosene, or other optically transparent fluid which will ensure a reliable optical path between windows 23 and 27. The fluid is chosen to match, as closely as possible, the optical index of refraction of windows 23 and 27 and, in turn, the glass fibers included within cable 13. Since such practice is conventional in the optical arts, and a wide variety of fluids are available which will serve the purposes of the invention, further detailed discussion thereof is believed unwarranted for the complete understanding of the invention.

The foregoing description taken together with the appended claims constitutes a disclosure such as to enable a person skilled in the optics and marine engineering arts and having the benefit of the teachings contained therein to make and use the invention.

Obviously, many modifications and variations of the present invention are possible in the light of the above teachings, and, it is therefore understood the invention may be practiced otherwise than specifically described.

What is claimed is:

1. An oceanographic winch for handling optical data transmission cable comprising:

a base member for attachment to a marine vessel;

a cylindrical support rotatably journaled in said support member;

an optical data transmission cable spoolably wound upon said cylindrical support for selectively paying-out therefrom and reeving-in thereon;

a rotatable optical window axially mounted on said cylindrical support for rotation therewith and optically connected to said optical data transmission cable as a terminal therefor;

a stationary optical window mounted on said base member positioned closely adjacent and in spaced relation to said rotatable optical window to provide an enclosed space therebetween and to pass optical data signals transmitted by said optical data transmission cable through said rotatable optical window;

seal means carried by said base member and cooperating with said cylindrical support to render said enclosed space fluid tight;

optically transparent fluid filling said enclosed space between said rotatable optical window and said stationary window so as to provide an optical path therebetween;

a channel extending through said base member from said enclosed space to the exterior of said base member; and optical means operatively connected to said stationary optical window for cooperation therewith in transmission of the optical signals and, thus, permit optical signal transmission along a variable length communication path in dependence on the length of optical data transmission cable unwound from said cylindrical support.

2. An oceanographic winch according to claim 1 wherein said optical means includes a length of optical data transmission cable.

3. An oceanographic winch according to claim 2 in which said optically transparent fluid material is chosen to have the same optical index of refraction as the optical data transmission cable.

4. An oceanographic winch according to claim 3 in which said fluid material is pressure regulated by pressure regulator means mounted on the exterior of said base member and in fluid communication with said channel.

5. An oceanographic winch according to claim 4 in which said pressure regulator means includes a bellows responsive to ambient pressure.

* * * * *